US012663669B2

(12) United States Patent
Shin et al.

(10) Patent No.: US 12,663,669 B2
(45) Date of Patent: Jun. 23, 2026

(54) VIEWING ANGLE ADJUSTMENT PANEL AND DISPLAY DEVICE INCLUDING SAME

(71) Applicant: Samsung Display Co., LTD., Yongin-si (KR)

(72) Inventors: Dong-Chul Shin, Yongin-si (KR); Yong Seok Kim, Yongin-si (KR); Min Hee Son, Yongin-si (KR); Myunghee Han, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/760,711

(22) Filed: Jul. 1, 2024

(65) Prior Publication Data

US 2025/0130451 A1 Apr. 24, 2025

(30) Foreign Application Priority Data

Oct. 23, 2023 (KR) ........................ 10-2023-0142055

(51) Int. Cl.
*G02F 1/13* (2006.01)
*G02F 1/1335* (2006.01)
*G02F 1/1337* (2006.01)
*G02F 1/1343* (2006.01)

(52) U.S. Cl.
CPC ...... *G02F 1/1323* (2013.01); *G02F 1/133512* (2013.01); *G02F 1/133726* (2021.01); *G02F 1/134309* (2013.01)

(58) Field of Classification Search
CPC ............. G02F 1/1323; G02F 1/133726; G02F 1/133512; G02F 1/134309
See application file for complete search history.

(56) References Cited

U.S. PATENT DOCUMENTS

| | | | | |
|---|---|---|---|---|
| 8,344,969 B2 * | 1/2013 | Yoon | H10K 59/50 345/82 |
| 9,500,888 B2 * | 11/2016 | Schwartz | G02F 1/1323 |
| 2014/0226093 A1 * | 8/2014 | Schwartz | G02F 1/1334 349/86 |
| 2014/0232960 A1 * | 8/2014 | Schwartz | B32B 3/30 349/12 |
| 2023/0217794 A1 | 7/2023 | Kim et al. | |

FOREIGN PATENT DOCUMENTS

| | | |
|---|---|---|
| KR | 10-2017-0068642 | 6/2017 |
| KR | 10-2020-0005206 | 1/2020 |
| KR | 10-2020-0040082 | 4/2020 |
| KR | 10-2021-0012419 | 2/2021 |
| KR | 10-2021-0094612 | 7/2021 |
| KR | 10-2023-0104506 | 7/2023 |

OTHER PUBLICATIONS

Huh et al., "Ion-doped liquid-crystal cell with low opaque-state specular transmittance based on electro-hydrodynamic effect", Dyes and Pigments, vol. 150, Mar. 2018, pp. (1-23).

* cited by examiner

*Primary Examiner* — David Y Chung
(74) *Attorney, Agent, or Firm* — F. CHAU & ASSOCIATES, LLC

(57) ABSTRACT

A viewing angle adjustment panel includes an organic film including a plurality of openings, and a liquid crystal layer located in the plurality of openings. The liquid crystal layer includes liquid crystal molecules and a dye, the liquid crystal molecules and the dye are oriented in a direction, and the viewing angle of the light that is oriented and passes through the liquid crystal layer is adjusted.

13 Claims, 11 Drawing Sheets

VIEWING ANGLE ADJUSTMENT PANEL AND DISPLAY DEVICE INCLUDING SAME

CROSS-REFERENCE TO RELATED APPLICATION(S)

This application claims priority to and the benefits of Korean Patent Application No. 10-2023-0142055 under 35 U.S.C. 119, filed on Oct. 23, 2023, in the Korean Intellectual Property Office (KIPO), the entire contents of which are incorporated herein by reference.

BACKGROUND

1. Technical Field

The disclosure relates to a viewing angle adjustment panel and a display device including the same.

2. Description of the Related Art

As the information society develops, the demand for display devices for displaying images is increasing in various forms.

The viewing angle adjustment panel may further include a first electrode and a second electrode that apply an electric field to the liquid crystal layer.

The first electrode may be located on a side wall of the plurality of openings, and the second electrode may be located on another side wall of the plurality of openings.

The first electrode may be located on a lower surface of the liquid crystal layer, and the second electrode may be located on an upper surface of the liquid crystal layer.

The liquid crystal layer located in the plurality of openings may be connected as one on an upper surface of the plurality of openings.

A part of the plurality of openings may be filled with a light blocking layer.

The liquid crystal layer may further include a reactive mesogen.

The reactive mesogen may include a compound represented by Formula 1 below:

[Formula 1]

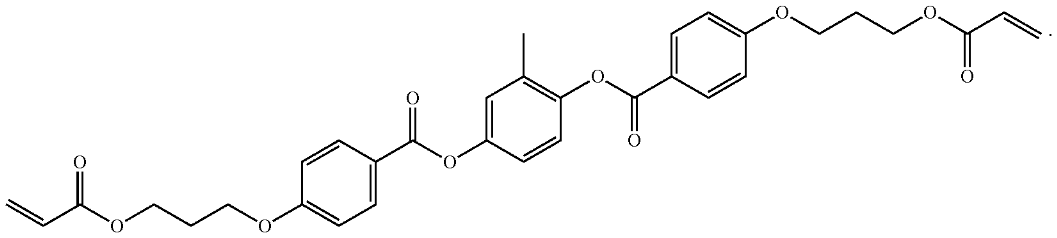

For example, display devices are applied to various electronic devices such as smartphones, digital cameras, laptop computers, navigation systems, and smart televisions.

The display device may be applied to a CID (center information display) placed on a vehicle's instrument panel, center fascia, or dashboard.

These display devices can secure the viewing angle using viewing angle technology, but if necessary, a film that limits the light exit angle can be used for security reasons or to improve image reflection.

However, in the process of limiting the light emission angle of the display panel, the aperture ratio of the display panel may decrease, thereby reducing luminance.

SUMMARY

Embodiments provides a viewing angle adjustment panel that can adjust the viewing angle while minimizing luminance degradation, and a display device including the same.

A viewing angle adjustment panel according to an embodiment may include an organic layer including a plurality of openings, and a liquid crystal layer located in the plurality of openings. The liquid crystal layer may include liquid crystal molecules and a dye, and the liquid crystal molecules and the dye may be oriented in a direction and adjust a viewing angle of light passing through the liquid crystal layer.

The display device according to an embodiment may include a display panel and a viewing angle adjustment panel disposed on and overlapping the display panel in a plan view. The display panel may include a substrate and a plurality of light emitting devices located on the substrate. The viewing angle adjustment panel may include an organic film including a plurality of openings and a liquid crystal layer located in the plurality of openings. The liquid crystal layer may include liquid crystal molecules and dyes, and the liquid crystal molecules and the dye may be oriented in a direction and adjust a viewing angle of light emitted from the plurality of light emitting devices.

A part of the plurality of openings may overlap the plurality of light emitting devices in a plan view.

The display device may further include a partition wall located between the plurality of light emitting devices. A part of the plurality of openings may overlap the partition wall in a plan view.

The plurality of openings overlapping the partition wall may be filled with a light blocking layer.

The display device may further include a first electrode and a second electrode that apply an electric field to the liquid crystal layer.

The first electrode may be located on a side wall of the plurality of openings, and the second electrode may be located on another side wall of the plurality of openings.

The first electrode may be located on a lower surface of the liquid crystal layer, and the second electrode may be located on an upper surface of the liquid crystal layer.

The liquid crystal layer located in the plurality of openings may be connected as one on a top surface of the plurality of openings.

The liquid crystal layer may further include a reactive mesogen.

The reactive mesogen may include a compound represented by Formula 1 below:

[Formula 1]

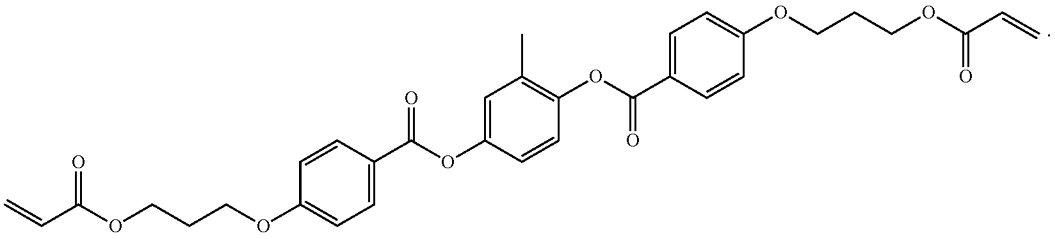

The display device may switch between a light blocking mode and a light transmitting mode depending on a voltage applied to the first electrode and the second electrode.

The display device may adjust front luminance and side luminance according to a voltage applied to the first electrode and the second electrode.

According to embodiments, a viewing angle adjustment panel that can adjust the viewing angle while minimizing luminance degradation and a display device including the same are provided.

DETAILED DESCRIPTION OF THE EMBODIMENTS

Figure 1:
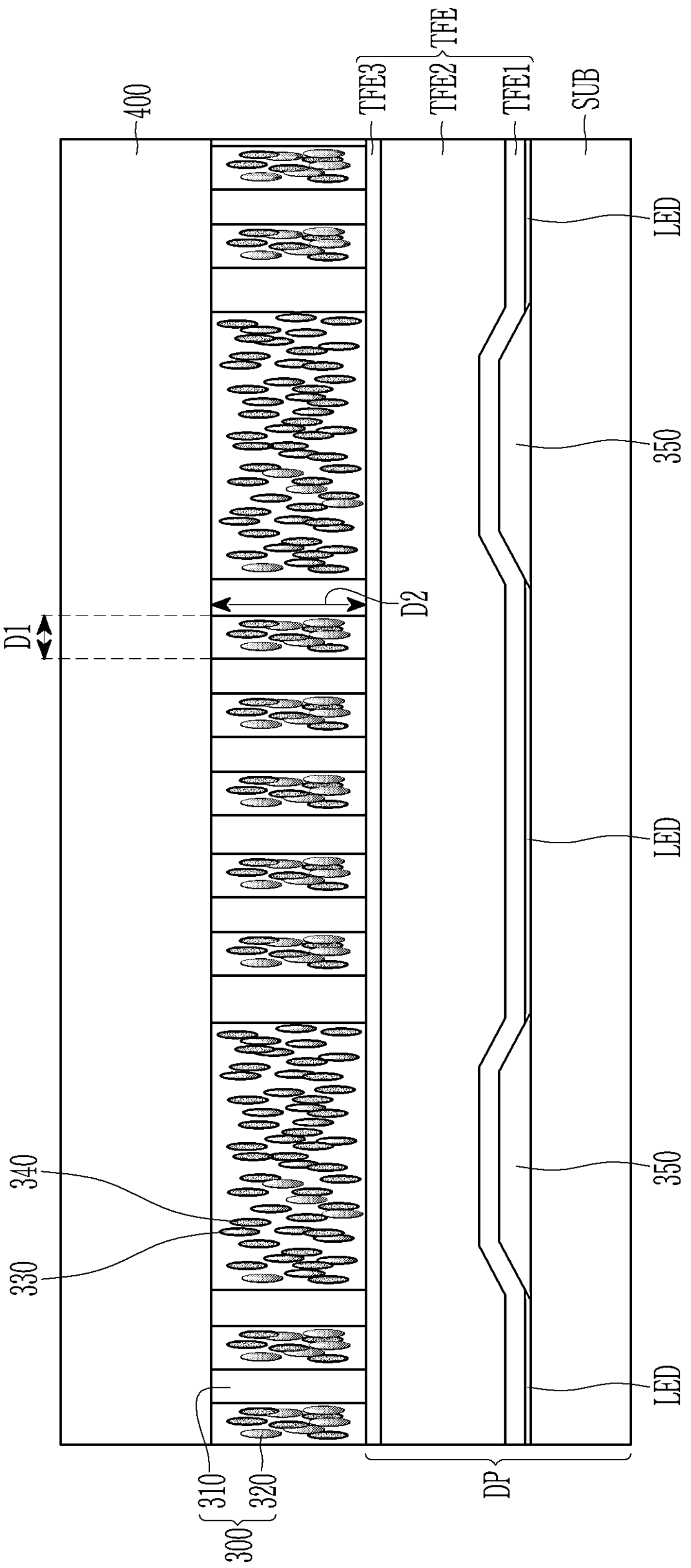
FIG. 1 is a schematic cross-sectional view of a display device according to an embodiment.

Hereinafter, with reference to the attached drawings, various embodiments of the disclosure will be described in detail so that those skilled in the art can readily implement the embodiments.

The disclosure may be implemented in many different forms and is not limited to the embodiments described herein.

In order to clearly explain the disclosure, parts that are not relevant to the description are omitted, and identical or similar components are assigned the same reference numerals throughout the specification.

In addition, the size and thickness of each component shown in the drawings are arbitrarily shown for convenience of explanation, so the disclosure is not necessarily limited to what is shown.

In the drawings, for convenience of explanation, the thicknesses of some layers and regions are exaggerated to clearly express various layers and areas.

Spatially relative terms, such as “beneath,” “below,” “under,” “lower,” “above,” “upper,” “over,” “higher,” “side” (e.g., as in “sidewall”), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as “below” or “beneath” other elements or features would then be oriented “above” the other elements or features. Thus, the exemplary term “below” can encompass both an orientation of above and below. Furthermore, the apparatus may be otherwise oriented (e.g., rotated 90 degrees or at other orientations), and, as such, the spatially relative descriptors used herein interpreted accordingly.

When an element, such as a layer, is referred to as being “on,” “connected to,” or “coupled to” another element or layer, it may be directly on, connected to, or coupled to the other element or layer or intervening elements or layers may be present. When, however, an element or layer is referred to as being “directly on,” “directly connected to,” or “directly coupled to” another element or layer, there are no intervening elements or layers present. To this end, the term “connected” may refer to physical, electrical, and/or fluid connection, with or without intervening elements.

The terminology used herein is for the purpose of describing particular embodiments and is not intended to be limiting. As used herein, the singular forms, “a,” “an,” and “the” are intended to include the plural forms as well, unless the context clearly indicates otherwise. Moreover, the terms “comprises,” “comprising,” “includes,” and/or “including,” when used in this specification, specify the presence of stated features, integers, steps, operations, elements, components, and/or groups thereof, but do not preclude the presence or addition of one or more other features, integers, steps, operations, elements, components, and/or groups thereof. "About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within +30%, 20%, 10%, 5% of the stated value.

In addition, throughout the specification, when reference is made to "on a plane" or "in a plan view", this means when the target part is viewed from above, and when reference is made to "in cross-section" or "in a cross-sectional view", this means when a cross-section of the target part is cut vertically and viewed from the side.

Unless otherwise defined or implied herein, all terms (including technical and scientific terms) used have the same meaning as commonly understood by those skilled in the art to which this disclosure pertains. It will be further understood that terms, such as those defined in commonly used dictionaries, should be interpreted as having a meaning that is consistent with their meaning in the context of the relevant art and should not be interpreted in an ideal or excessively formal sense unless clearly defined in the specification.

A display device according to an embodiment of the disclosure will be described below with reference to the drawings.

FIG. 1 is a schematic cross-sectional view of a display device according to an embodiment.

Referring to FIG. 1, the display device according to an embodiment may include a display panel DP and a viewing angle adjustment panel 300.

Referring to FIG. 1, the display panel DP may include a substrate SUB, a partition wall 350 located on the substrate SUB, a light emitting device LED disposed in an opening of a partition wall 350, and an encapsulation layer TFE located on the light emitting device LED.

The encapsulation layer TFE may be a multi-layered structure including a first layer TFE1, a second layer TFE2, and a third layer TFE3, but the disclosure is not limited thereto.

In one embodiment, the first layer TFE1 and the third layer TFE3 may be an inorganic layer, and the second layer TFE2 may be an organic layer.

Although not shown in FIG. 1, each light emitting device LED may include a first electrode connected to each transistor located on the substrate SUB, and the first electrode, a light emitting layer, and a second electrode may constitute a light emitting device LED.

The main feature of the disclosure is the configuration of the viewing angle adjustment panel 300, and since the display panel DP is not limited to a specific shape, the following description will focus on the configuration of the viewing angle adjustment panel 300.

For example, in the display device according to an embodiment, the display panel DP may be used without restrictions.

Referring to FIG. 1, the viewing angle adjustment panel 300 according to an embodiment may include an organic layer 310 including multiple openings and a liquid crystal layer 320 filling the openings.

A cover glass 400 may be positioned on the viewing angle adjustment panel 300.

As shown in FIG. 1, the liquid crystal layer 320 may be located in the space between the organic layers 310.

According to an embodiment, the liquid crystal layer 320 may include liquid crystal molecules 330 and a dye 340.

The organic layer 310 may be transparent.

The liquid crystal layer 320 may include dye 340, and may block light incident from the display panel DP.

As will be explained below, the display device according to an embodiment may adjust a brightness of the top and bottom without reducing the luminance using the viewing angle adjustment panel 300 including a liquid crystal layer 320 containing liquid crystal molecules 330 and a dye 340.

By applying an electric field to the liquid crystal layer 320, the luminance for each viewing angle may be appropriately controlled according to the usage environment.

The display device may require privacy protection or blocking of luminance up, down, left, and right in the usage environment.

For example, in the case of a display for the windshield of a car, it may be possible to install a separate display for the passenger seat of a person who is not required to look ahead.

However, at night, the light emitted from the display in all directions may be reflected by the windshield, disturbing the person in the passenger seat and obstructing the driver's view.

In an environment where privacy is required, it may be desirable to use a display in which only people in the front can view the display and the screen is not visible from the sides, top and bottom.

Accordingly, the display device according to an embodiment may be characterized by reducing the luminance on the side or upper and lower sides through the viewing angle adjustment panel 300 without reducing the luminance on the front.

Therefore, privacy may be protected, and the display may be applied to various usage environments.

Typically, the viewing angle adjustment panel 300 includes an organic layer 310 including multiple openings and a light blocking layer filling the organic layer 310.

However, in case that a light blocking layer is included, there is a problem in that the transmittance and luminance at the front are reduced by the light blocking layer.

In other words, as the light blocking layer is located in the area overlapping the light emitting device in a plan view, light emitted to the front may be blocked, thereby reducing luminous efficiency.

However, in the display device according to an embodiment, the viewing angle adjustment panel 300 may include liquid crystal molecules 330 and dye 340.

Due to the alignment of the liquid crystal molecules 330 and the dye 340, light in a certain direction may be blocked but light in another direction may be transmitted, so the side brightness or the brightness in the vertical direction may be reduced without reducing the front brightness.

By applying an electric field to the liquid crystal layer 320, the light blocking mode or light transmitting mode may be appropriately adjusted depending on the usage environment.

Referring to FIG. 1, the width D1 of the organic layer 310 in the part overlapping the light emitting device LED may be in a range of about 1 μm to about 10 μm.

For example, the width D1 of the organic layer 310 may be in a range of about 3 μm to about 5 μm.

The depth D2 of the opening of the organic layer 310 may be in a range of about 15 μm to about 25 μm.

However, the width D1 of the organic layer 310 and the depth D2 of the opening is not limited thereto and may be appropriately modified depending on the embodiment.

Liquid crystal molecules 330 included in the liquid crystal layer 320 may be nematic liquid crystal molecules or cholesteric liquid crystal molecules.

In case that the liquid crystal layer 320 includes cholesteric liquid crystal molecules, light in all polarization directions may be absorbed.

Liquid crystal molecules 330 may be either negative liquid crystal molecules or positive liquid crystal molecules.

Figure 2:
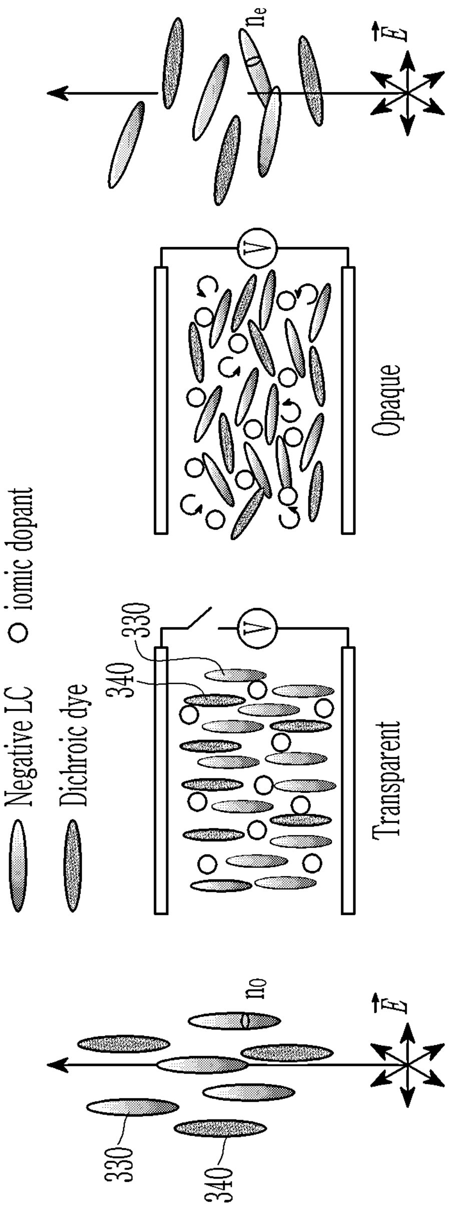
FIG. 2 is a schematic diagram illustrating principles of light blocking and transmission according to the application of an electric field in a liquid crystal layer containing dye.

FIG. 2 is a schematic diagram illustrating principles of light blocking and transmission according to the application of an electric field in a liquid crystal layer containing dye.

FIG. 2 schematically shows negative liquid crystal molecules and dye.

Referring to FIG. 2, in case that the liquid crystal molecules 330 and dye 340 are arranged in a direction parallel to the direction of light, light absorption may rarely occur.

However, in case that the liquid crystal molecules 330 and the dye 340 are arranged in a direction perpendicular to the direction of light travel, light absorption may occur by the dye.

Therefore, in case that the liquid crystal layer 320 containing liquid crystal molecules 330 and dye 340 is used as a partition of the viewing angle adjustment panel 300, light may be effectively blocked.

Light blocking and transmission may be appropriately adjusted depending on the application of the electric field.

Figure 3:
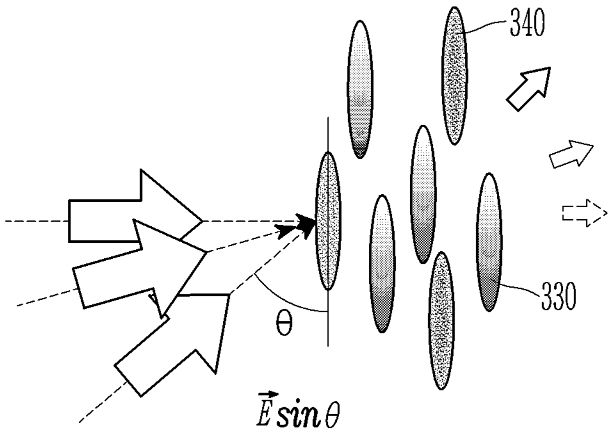
FIG. 3 is a schematic diagram illustrating the absorption rate according to the angle (0) between the incident light and the dye alignment axis.

FIG. 3 is a schematic diagram illustrating the absorption rate according to the angle (θ) between the incident light and the dye alignment axis.

FIG. 3 schematically shows that the absorption rate was measured while varying the angle (θ) between the incident light and the dye alignment axis, and the results are shown in Table 1 below.

TABLE 1

| angle (θ) | absorption rate (%) |
|---|---|
| 5 | 8.7% |
| 10 | 17.4% |
| 15 | 25.9% |
| 20 | 34.2% |
| 25 | 42.3% |
| 30 | 50.0% |
| 35 | 57.4% |
| 40 | 64.3% |
| 45 | 70.7% |

TABLE 1-continued

| angle (θ) | absorption rate (%) |
|---|---|
| 50 | 76.6% |
| 55 | 81.9% |
| 60 | 86.6% |
| 65 | 90.6% |
| 70 | 94.0% |
| 75 | 96.6% |

Referring to Table 1 above, it was confirmed that as the angle increases, the absorption rate by the dye increases, thereby ensuring good light blocking.

It was also confirmed that the absorption rate gradually decreases as the angle decreases.

The viewing angle adjustment panel 300 that includes a light blocking layer instead of a liquid crystal layer 320 may have a problem in which luminance suddenly decreases at a specific angle.

For example, not only does the front luminance decrease due to the light blocking layer, but the luminance may also drop sharply in case that the side angle changes, which may be undesirable in certain usage environments.

However, the viewing angle adjustment panel 300 including a liquid crystal layer 320 may be desirable because the luminance gradually decreases, as can be seen in Table 1 above.

In FIG. 1, the liquid crystal layer 320 located in the openings of each organic layer 310 are shown as being separated from each other. However, the disclosure is not limited thereto, and the liquid crystal layer 320 may be connected as one.

Figure 4:
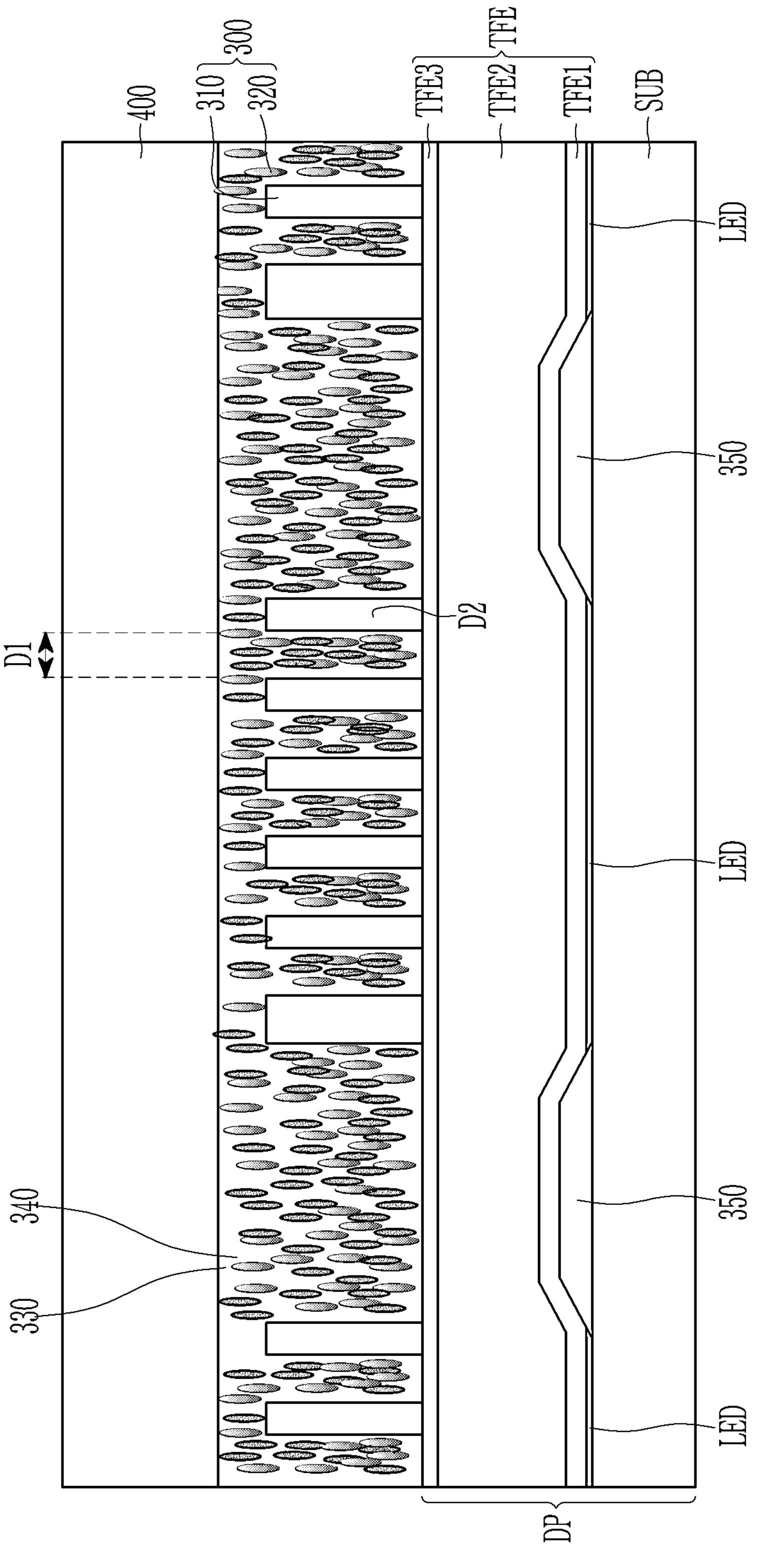
FIG. 4 is a schematic cross-sectional view of a display device according to another embodiment.

FIG. 4 is a schematic cross-sectional view of a display device according to another embodiment.

The display device of FIG. 4 may be the same as the embodiment of FIG. 1 except that the liquid crystal layer 320 is connected as one.

Detailed descriptions of the same components are omitted.

The liquid crystal layer 320 of the viewing angle adjustment panel 300 of the display device according to an embodiment may further include reactive mesogen.

For example, the liquid crystal layer 320 of the viewing angle adjustment panel 300 according to an embodiment may further include reactive mesogen.

The liquid crystal layer containing a reactive mesogen may be formed into a film through a UV curing process.

For example, the reactive mesogen may include a compound represented by the following Formula 1, but the disclosure is not limited thereto.

[Formula 1]

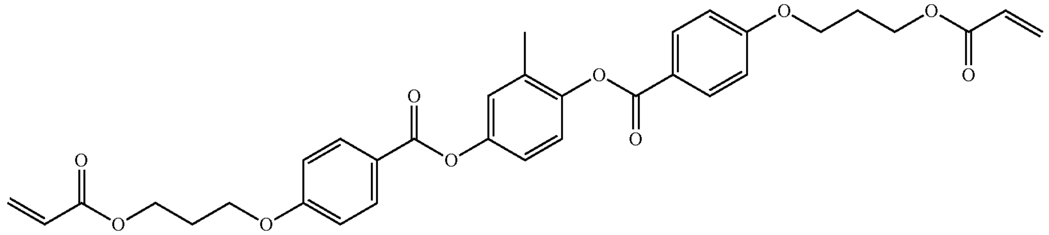

Figure 5:
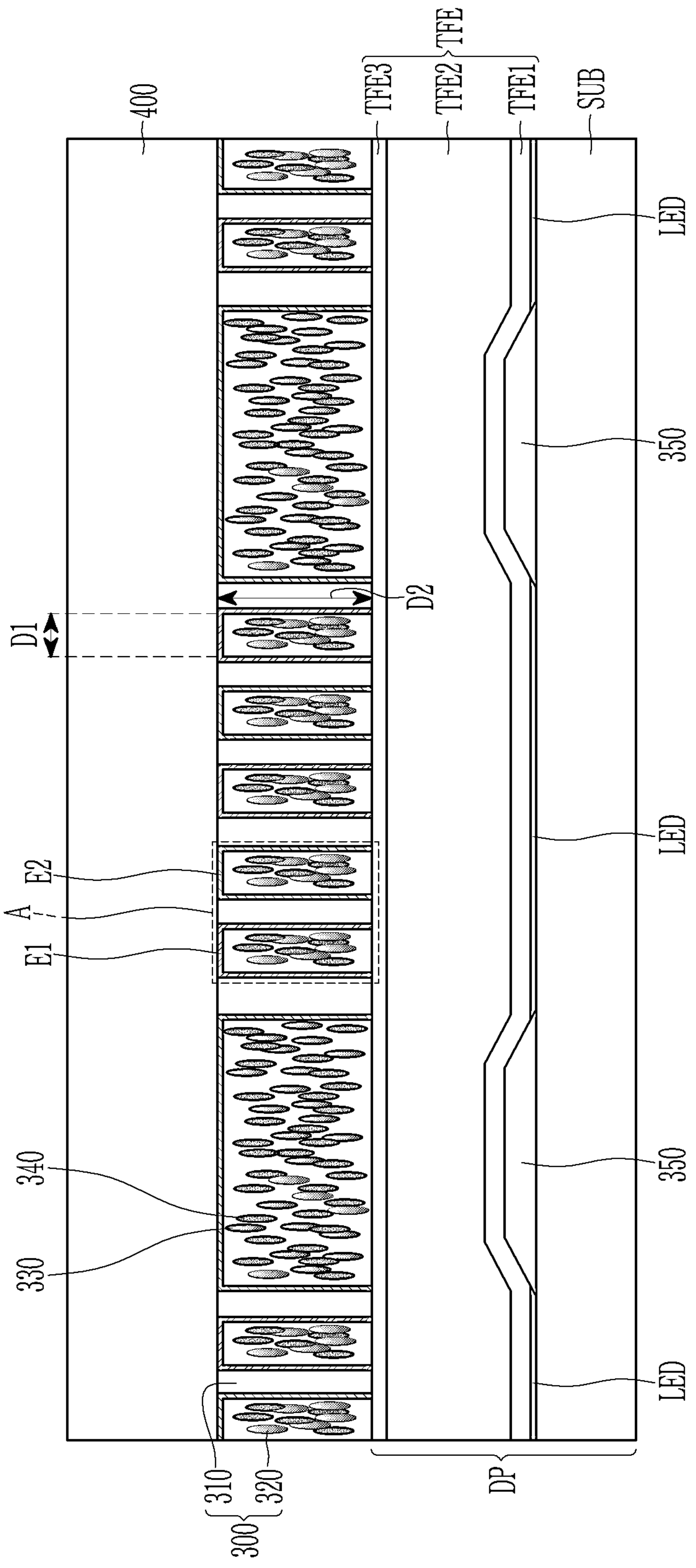
FIG. 5 is a schematic cross-sectional view of a display device according to another embodiment.

FIG. 5 is a schematic cross-sectional view of a display device according to another embodiment.

The display device of FIG. 5 may be the same as the embodiment of FIG. 1 except that the display device of FIG. 5 further includes a first electrode E1 and a second electrode E2.

Detailed descriptions of the same components are omitted.

Referring to FIG. 5, in the display device according to an embodiment, the first electrode E1 and the second electrode E2 may be alternately positioned one by one with the openings of each organic layer 310 interposed between the first electrode E1 and the second electrode E2.

A data voltage may be applied to the first electrode E1, and a common voltage may be applied to the second electrode E2.

Depending on the voltage applied to the first electrode E1 and the second electrode E2, the alignment state of the liquid crystal layer 320 may change, and the viewing angle adjustment panel 300 may be switched to a light transmission mode or a light blocking mode.

Figure 6:
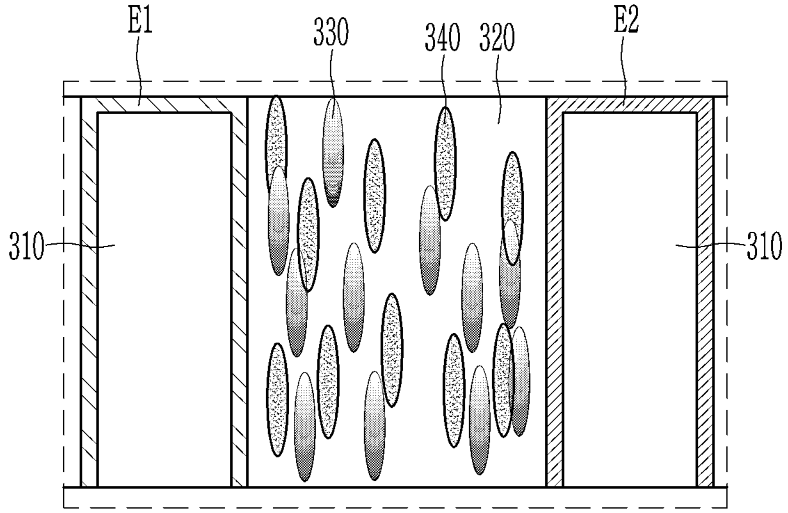
FIG. 6 is a schematic cross-sectional view of area A in FIG. 5 according to an embodiment.
Figure 7:
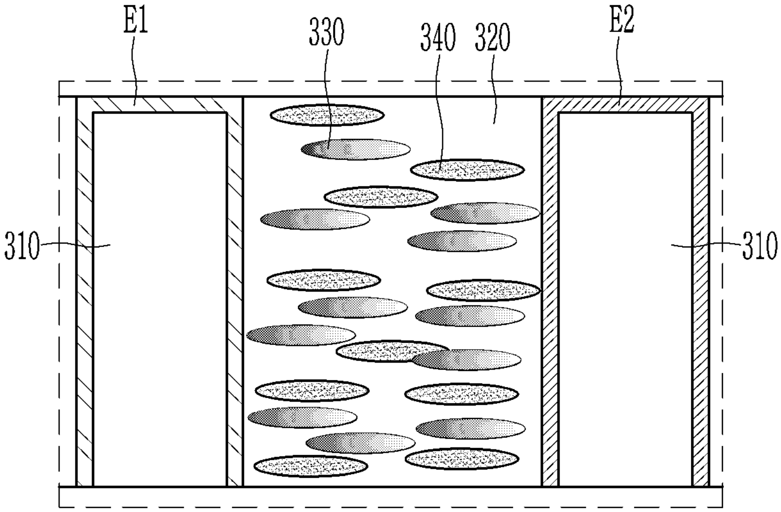
FIG. 7 is a schematic cross-sectional view of area A in FIG. 5 according to an embodiment.

FIG. 6 and FIG. 7 are schematic cross-sectional views of area A in FIG. 5 according to an embodiment.

As shown in FIG. 6 and FIG. 7, the alignment state of the liquid crystal layer 320 may change depending on voltage application, and the viewing angle adjustment panel 300 may be switched to a light transmission mode or a light blocking mode.

In FIG. 5, a configuration is shown in which the first electrode E1 and the second electrode E2 are alternately located with each opening of the organic film 310 in between, but the formation positions of the first electrode E1 and the second electrode E2 may vary.

Figure 8:
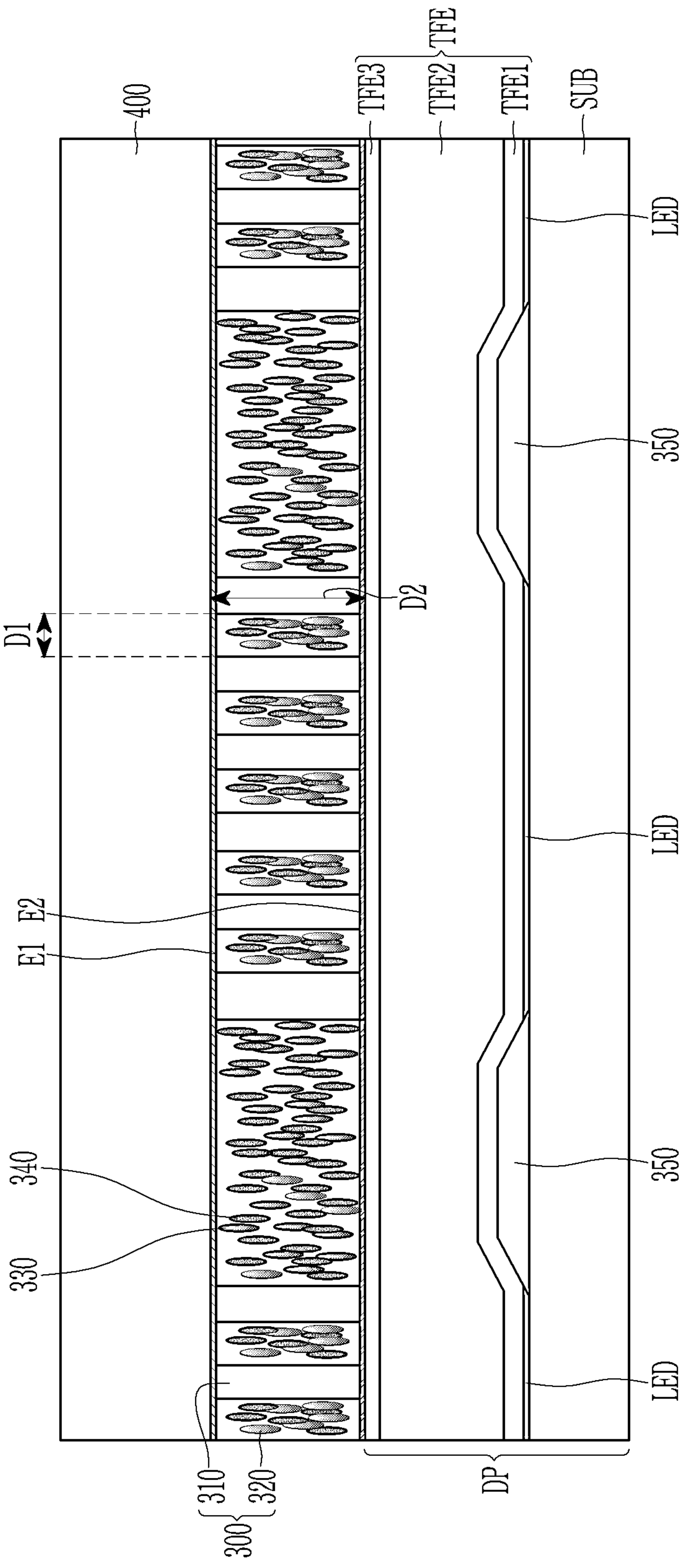
FIG. 8 is a schematic cross-sectional view of a display device according to another embodiment.

FIG. 8 is a schematic cross-sectional view of a display device according to another embodiment.

The display device of FIG. 8 is the same as the embodiment of FIG. 5 except for the positions of the first electrode E1 and the second electrode E2.

Detailed descriptions of the same components are omitted.

Referring to FIG. 8, the first electrode E1 and the second electrode E2 may be located on the upper and lower surfaces of the viewing angle adjustment panel 300 and face each other.

By applying a voltage to the first electrode E1 and the second electrode E2, the orientation direction of the liquid crystal molecules 330 of the liquid crystal layer 320 may change, and the light blocking mode and light transmission mode may be switched.

In another embodiment, the display device may include an electrode arrangement that combines the shapes of FIG. 5 and FIG. 8.

Figure 9:
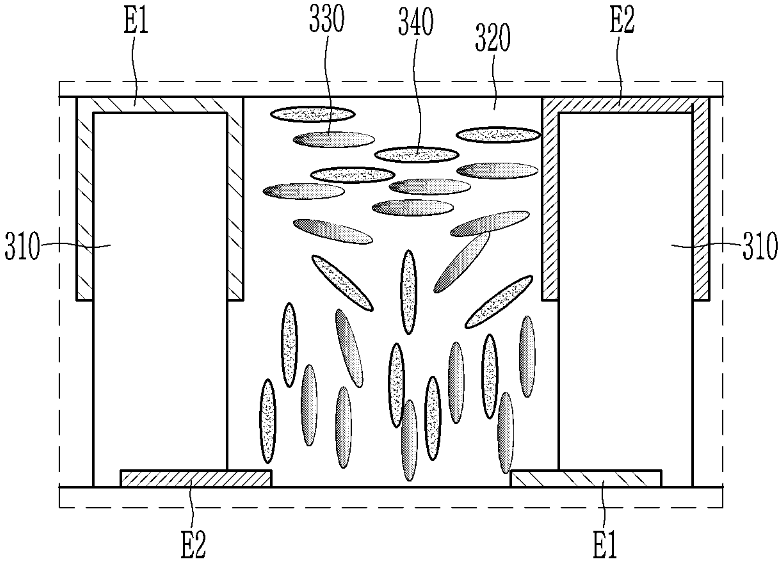
FIG. 9 is a schematic cross-sectional view of area A in FIG. 5 according to another embodiment.

FIG. 9 is a schematic cross-sectional view of area A in FIG. 5 according to another embodiment.

Referring to FIG. 9, in the viewing angle adjustment panel 300 according to an embodiment, the first electrode E1 and the second electrode E2 may be located on both the side and bottom surfaces of the opening of the organic layer 310.

Therefore, as shown in FIG. 9, the orientation state of the liquid crystal molecules 330 may vary for each region, and the refractive index or viewing angle may be adjusted.

Figure 10:
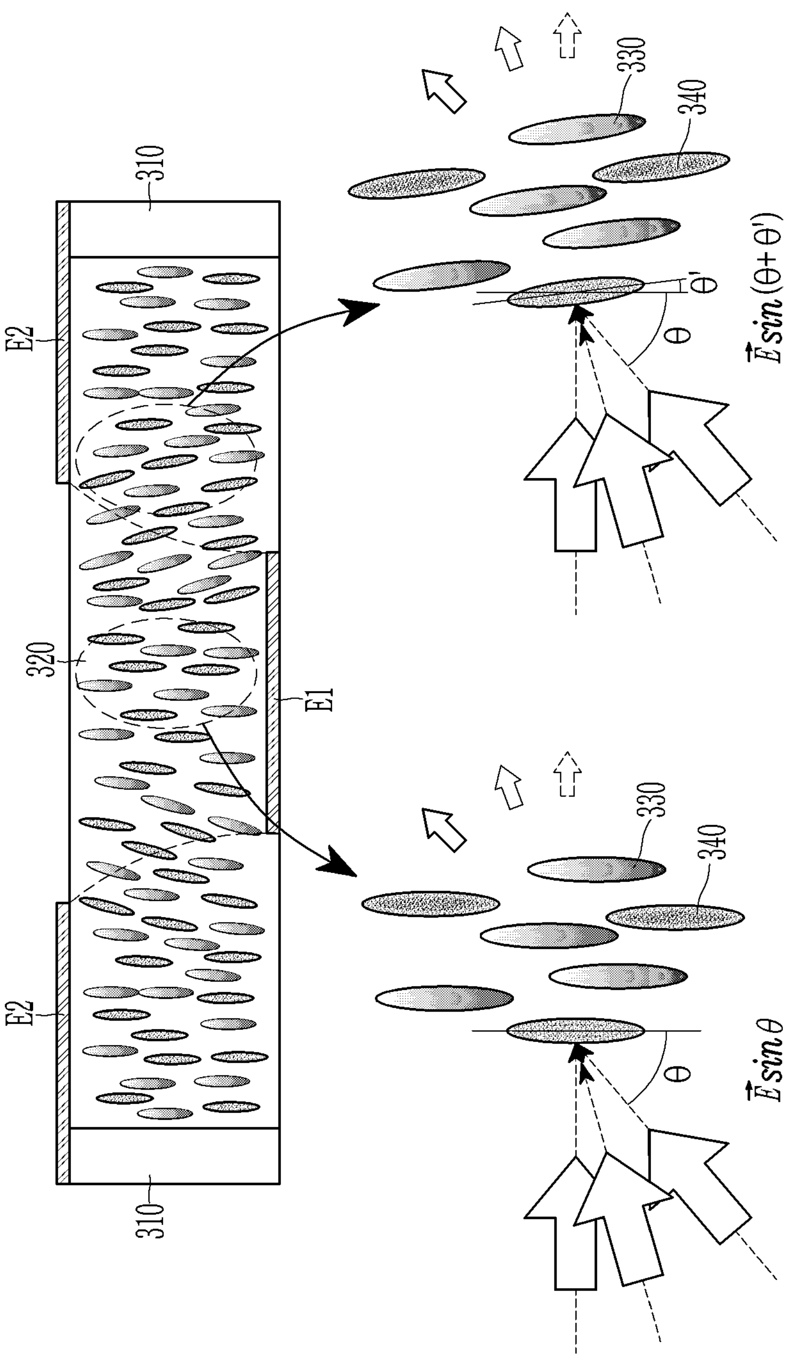
FIG. 10 is a schematic cross-sectional view of area A in FIG. 5 according to another embodiment.

FIG. 10 is a schematic cross-sectional view of area A in FIG. 5 according to another embodiment.

Referring to FIG. 10, in the viewing angle adjustment panel 300 according to an embodiment, the first electrode E1 may be disposed on an upper surface of the viewing angle adjustment panel 300, and the second electrode E2 may be disposed on a lower surface of the viewing angle adjustment panel 300.

Therefore, the dye 340 may be tilted (θ') in response to the fringe field between the first electrode E1 and the second electrode E2, and the lateral cutoff characteristics may be further improved by adjusting the degree of tilt.

In other words, the degree of viewing angle adjustment may be precisely adjusted for each area, and the viewing angle may be appropriately adjusted depending on the usage environment.

In the case of automotive displays, there may be differences in frontal viewing angle depending on the height of the occupant.

In this embodiment, the front and side luminance may be appropriately controlled according to the height of the boarding area, and an optimal viewing environment may be realized for each usage environment.

Below, a configuration in which all openings of the organic layer 310 are filled with the liquid crystal layer 320 is shown; however, the disclosure is not limited thereto, and in another embodiment, some of the openings in the organic layer 310 may be filled with the light blocking layer 360.

For example, the display device may include a mixed form of the light blocking layer 360 and the liquid crystal layer 320.

Figure 11:
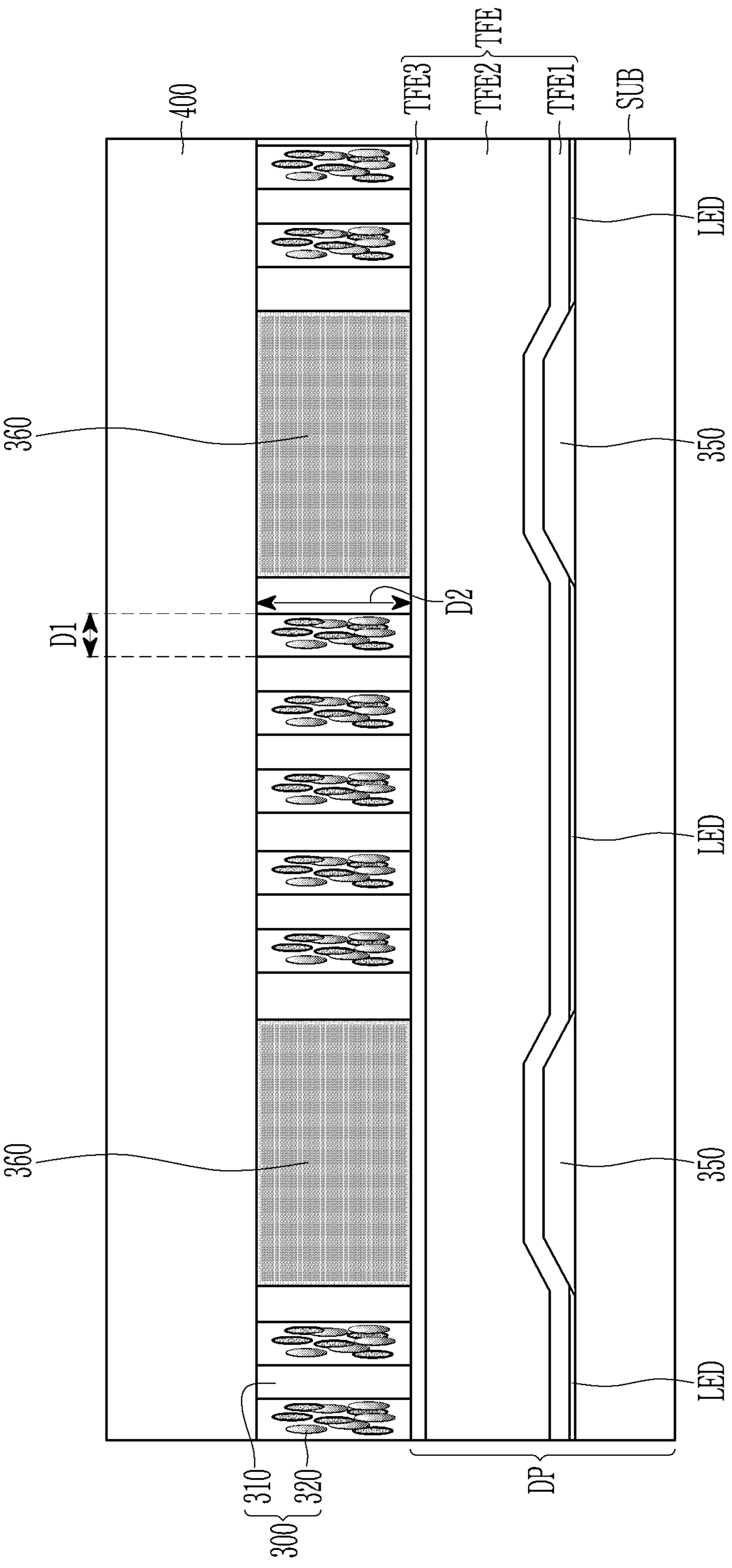
FIG. 11 is a schematic cross-sectional view of a display device according to another embodiment.

FIG. 11 is a schematic cross-sectional view of a display device according to another embodiment.

Referring to FIG. 11, in the viewing angle adjustment panel 300 of the display device according to an embodiment, a part of the opening of the organic film 310 may be filled with the light blocking layer 360 and another part of the opening may be filled with the liquid crystal layer 320.

As shown in FIG. 11, the light blocking layer 360 may be filled in the part that overlaps the partition wall 350 of the display panel DP in a plan view, and the liquid crystal layer 320 may be located in the part that overlaps the light emitting device LED in a plan view.

As described above, in case that the viewing angle adjustment panel 300 includes the light blocking layer 360, frontal luminance may be reduced.

However, since the part overlapping the partition wall 350 is not an area where light emission occurs, the front luminance may not be affected, and accordingly, the part overlapping the partition wall 350 may be filled with the light blocking layer 360.

As shown in FIG. 11, a liquid crystal layer 320 containing liquid crystal molecules 330 and dye 340 may be located in the area overlapping the light emitting device LED to prevent frontal brightness from decreasing and to narrow or widen the viewing angle depending on the usage environment.

The above description is an example of technical features of the disclosure, and those skilled in the art to which the disclosure pertains will be able to make various modifications and variations. Therefore, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. A viewing angle adjustment panel, comprising:
an organic film including a plurality of openings;
a liquid crystal layer located in the plurality of openings; and
a first electrode and a second electrode that apply an electric field to the liquid crystal layer, wherein
the liquid crystal layer includes liquid crystal molecules and dye,
the liquid crystal molecules and the dye are oriented in a direction and adjust a viewing angle of light passing through the liquid crystal layer,
the first electrode is located on a side wall of the plurality of openings, and
the second electrode is located on another side wall of the plurality of openings.

2. The viewing angle adjustment panel of claim 1, wherein the liquid crystal layer located in the plurality of openings is connected as one on an upper surface of the plurality of openings.

3. The viewing angle adjustment panel of claim 1, wherein the liquid crystal layer further includes a reactive mesogen.

4. The viewing angle adjustment panel of claim 3, wherein the reactive mesogen includes a compound represented by Formula 1 below

[Formula 1]

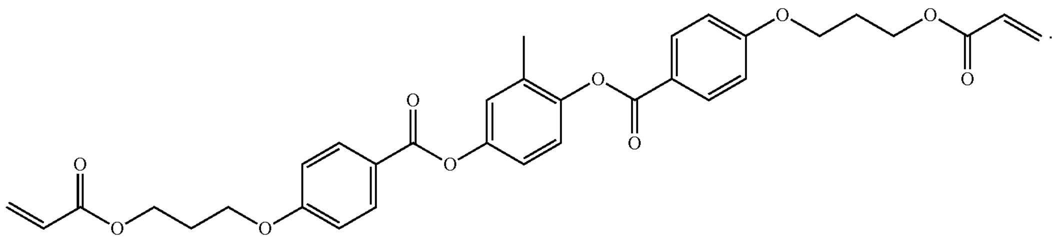

5. A display device, comprising:
a display panel; and
a viewing angle adjustment panel disposed on and overlapping the display panel in a plan view, wherein
the display panel comprises a substrate and a plurality of light emitting devices located on the substrate,
the viewing angle adjustment panel comprises:
an organic film including a plurality of openings;
a liquid crystal layer located in the plurality of openings;
a first electrode and a second electrode that apply an electric field to the liquid crystal layer,
the liquid crystal layer includes liquid crystal molecules and dye,
the liquid crystal molecules and the dye are oriented in a direction and adjust a viewing angle of light emitted from the plurality of light emitting devices,
the first electrode is located on a side wall of the plurality of openings, and
the second electrode is located on another side wall of the plurality of openings.

6. The display device of claim 5, wherein a part of the plurality of openings overlaps the plurality of light emitting devices in a plan view.

7. The display device of claim 5, further comprising:
a partition wall located between the plurality of light emitting devices, wherein
a part of the plurality of openings overlaps the partition wall in a plan view.

8. The display device of claim 7, wherein the plurality of openings overlapping the partition wall is filled with a light blocking layer.

9. The display device of claim 5, wherein the liquid crystal layer located in the plurality of openings is connected as one at a top of the plurality of openings.

10. The display device of claim 5, wherein the liquid crystal layer further includes a reactive mesogen.

11. The display device of claim 10, wherein the reactive mesogen includes a compound represented by Formula 1 below:

[Formula 1]

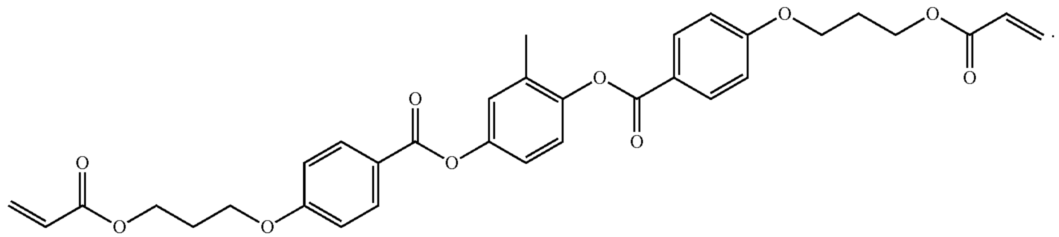

12. The display device of claim 5, wherein the display device switches between a light blocking mode and a light transmitting mode depending on a voltage applied to the first electrode and the second electrode, and the first electrode and the second electrode are alternately arranged with each of the openings in a horizontal direction of the display device that is perpendicular to a thickness direction of the display device.

13. The display device of claim 5, wherein the display device adjusts front luminance and side luminance according to a voltage difference applied between the first electrode and the second electrode.

* * * * *